United States Patent [19]

Euler

[11] 4,106,311
[45] Aug. 15, 1978

[54] NO-LASH AXIALLY MOVABLE STEERING COLUMN

[75] Inventor: Richard W. Euler, La Porte, Ind.

[73] Assignee: The Bendix Corporation, Southfield, Mich.

[21] Appl. No.: 750,295

[22] Filed: Dec. 13, 1976

[51] Int. Cl.$^2$ .................... F16D 3/06; B62D 1/18
[52] U.S. Cl. ................................ 64/23; 74/492; 403/359; 403/377
[58] Field of Search ............... 74/492, 493, 531; 64/23; 403/377, 350, 359; 85/8.8; 24/218

[56] References Cited

U.S. PATENT DOCUMENTS

| | | | |
|---|---|---|---|
| 2,865,076 | 12/1958 | Newton et al. | 85/8.8 |
| 3,000,231 | 9/1961 | Cochran | 74/531 X |
| 3,068,980 | 12/1962 | Smirl | 64/23 X |
| 3,318,170 | 5/1967 | Runkle | 64/23 X |
| 3,369,425 | 2/1968 | Runkle et al. | 64/23 X |
| 3,434,369 | 3/1969 | Runkle | 64/23 UX |
| 3,473,406 | 10/1969 | Runkle | 64/23 X |
| 3,575,015 | 4/1971 | Geisthoff et al. | 64/23 |
| 3,695,646 | 10/1972 | Mommsen | 24/218 X |

Primary Examiner—Allan D. Hermann
Attorney, Agent, or Firm—Paul David Schoenle; Ken C. Decker

[57] ABSTRACT

A variable length steering column assembly provides a telescoping polygonal tube and shaft. A spring clip is engageable with the tube and the shaft in order to eliminate any torsional lash therebetween and to provide for axial movement between the shaft and tube when the axial forces therebetween exceed a predetermined value. The spring clip is releasably connected to the tube and shaft through openings on the tube. One end of the spring clip engages the side wall of a tube opening and the other end extends through another tube opening to engage the shaft. The spring clip extends over the outer circumference of the tube and is releasably connected to the tube and shaft so that the spring clip is easily disconnected from its engaged position with the tube and shaft remaining in telescoping relation.

6 Claims, 4 Drawing Figures

4,106,311

NO-LASH AXIALLY MOVABLE STEERING COLUMN

BACKGROUND OF THE INVENTION

Lash-free collapsible steering columns are provided by the prior art for preventing injury to a motor vehicle operator when an abrupt stop occurs and the operator is thrown against the steering wheel. These prior art steering columns collapse when the axial forces on the columns are above a predetermined value. Moreover, the prior art steering columns are lash-free as a result of internal force transmitting abutments that engage an inner shaft and an outer tube to take up the clearance therebetween. Consequently, rotational play between the shaft and tube is eliminated.

In view of the internal force transmitting abutments it is necessary to separate the shaft and tube in order to examine these abutments or replace the same. Therefore, it is believed to be desirable to provide a simple and economical lash-free mechanism for a tube and shaft wherein assembly and disassembly of the lash-free mechanism is managed with the tube and shaft in telescoped position.

SUMMARY OF THE INVENTION

In a variable length column for a collapsible steering column or the like, a tube includes a polygonal bore, and a shaft with a polygonal surface is telescoped into the tube. In order to frictionally connect the tube and shaft and take up any radial clearance therebetween, a generally C-shaped spring clip is provided. The spring clip extends around the outer surface of the tube and includes ends that are inserted into an opening on the tube to engage the tube and through another opening on the tube to engage the shaft.

The end of the spring clip that engages the shaft remains in spaced relation to the tube while the end engaging the tube includes an adjacent portion that abuts the tube to prevent the tube engaging end of the spring clip from extending into the tube polygonal bore and engaging the shaft.

The ends of the spring clip are generally U-shaped and cooperate with axially elongated slots on the tube to engage the tube and the shaft.

DETAILED DESCRIPTION OF THE INVENTION

Figure 1:
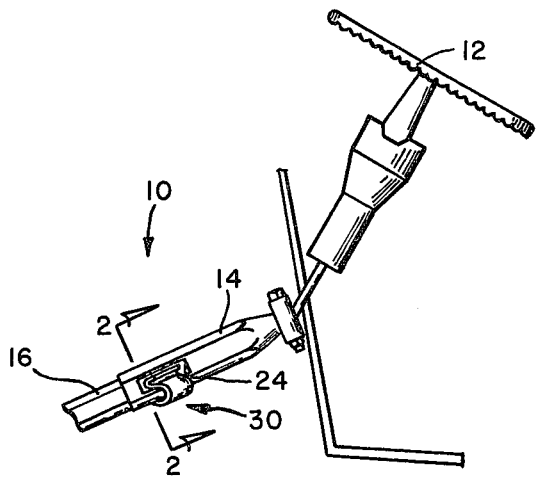
FIG. 1 is a schematic view of a collapsible steering column assembly.

Referring to FIG. 1, a collapsible steering column assembly is indicated generally by the numeral 10. The steering column assembly 10 is operatively connected by any suitable means to a steering wheel 12 at one end and to a dirigible pair of wheels (not shown) at the other end in a manner well known to those skilled in the art.

To provide for extension and retraction of the steering column 10, a tube 14 receives a shaft 16. The tube 14 includes a polygonal bore 18 and the shaft 16 includes a corresponding polygonal surface 20, which telescopes into the polygonal bore 18 to form a clearance between the shaft 16 and tube 14. This clearance permits slight rotation of shaft 16 within bore 18, which rotation is referred to as lash. In the clockwise rotated position of the shaft 16, illustrated in FIG. 2, the edges 22 of the polygonal surface 20 abut the polygonal bore 18 to provide a rotated one directional locking fit between the tube 14 and shaft 16.

In accordance with the present invention a flexible coupling means 30 is provided to yieldably maintain the shaft 16 and the tube 14 in the rotated one directional locking fit position. The flexible coupling means 30 comprises a generally C-shaped spring clip that terminates in substantially U-shaped ends 32 and 34. From the free state condition illustrated in phantom in FIG. 2, the spring clip 30 is deflected such that the end 32 extends into an axially elongated slot 24 and the end 34 extends into the axially elongated slot 26.

The portion of the spring clip 30 at 36 adjacent end 34 abuts the outer circumference of the tube 14, so that the end 34 extends into the axially elongated slot 26 and abuts the side wall thereof without extending past the axially elongated slot into the polygonal bore 18. Consequently, the spring clip end 34 does not interfere nor come in contact with the shaft 16, so long as the spring clip end 32 remains within the axially elongated slot 24. Turning to the spring clip end 32, it is seen that the end 32 projects into the polygonal bore 18. The resilient force of the spring clip 30 yieldably urges the shaft 16 to a clockwise rotated position, as the end 32 engages the shaft 16 at an off-center position. Moreover, the portion of the spring clip at 38 is in spaced relation to the tube 14 so that the spring clip end 32 remains engaged with the shaft 16 throughout the rotational play or lash of the shaft 16 relative to the longitudinal bore 18 of the tube 14.

Figure 3:
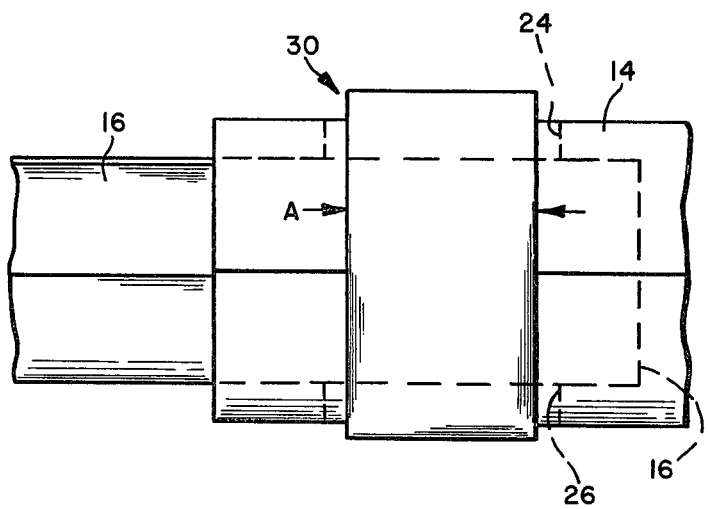
FIG. 3 is a longitudinal right side view of FIG. 2.

As illustrated in FIG. 3, the C-shaped spring clip 30 extends from slot 24 to slot 26 substantially perpendicular to the longitudinal axis of the bore 18 within which the shaft telescopes. In addition, FIG. 3 shows that the shaft 16 telescopes into the bore 18 past the slots 24 and 26. Consequently, the end 32 of the spring clip 30 cannot extend at any axial position along slot 24 into the longitudinal bore 18 radially past the shaft 16. Therefore, the spring clip 30 cooperates with the shaft 16 and tube 14, regardless of the axial position of the spring clip 30 along the slot 24, to eliminate lash between the shaft and the tube. The spring clip 30 includes a width dimension A such that the spring clip 30 forms an axial clearance with the slots 24 and 26 so that the spring clip is free, absent friction, to move axially within the slots.

Figure 4:
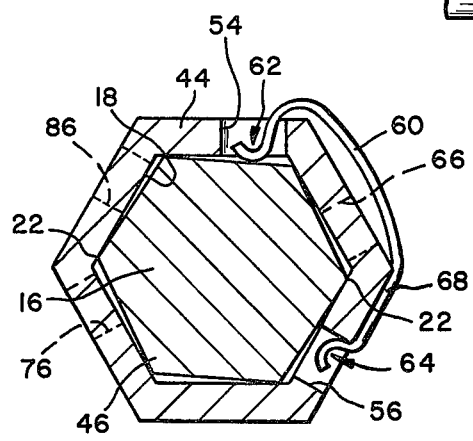
FIG. 4 is a cross-sectional view, similar to FIG. 2, illustrating a modification of the present invention.

In the modification of FIG. 4, wherein common elements retain the same reference numerals, the C-shaped spring clip 60 is dimensioned such that the ends 62 and 64 of the spring clip 60 cooperate with slots 54 and 56 to engage the tube 44 and the shaft 46 to eliminate lash therebetween. It is noted that the slots 54 and 56 are disposed on surfaces of the polygonal tube 44 that are not opposite each other. Likewise, the slot 56 could be positioned, as indicated in phantom in FIG. 4, at 66, 76 or 86 provided the end 62 of the spring clip 60 extends into the slot 54 and engages the shaft 46 when the end 64 is disposed in these slots, whereby the spring clip eliminates lash between the shaft and the tube.

Figure 2:
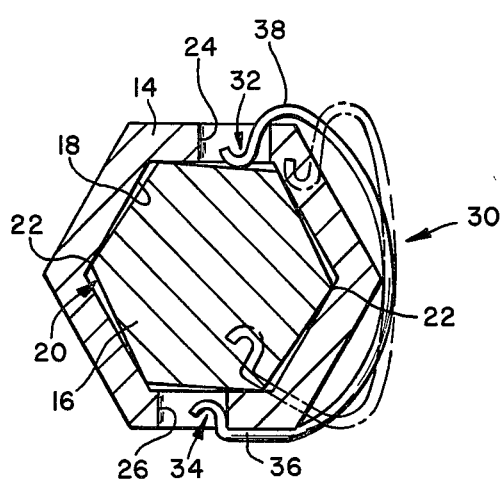
FIG. 2 is a cross-sectional view taken along line 2—2 of FIG. 1.

Incidentally, it will be appreciated viewing FIG. 2, that the spring clip 30 could be removed from the slots 24 and 26 and refitted to the tube 14 so that the end 32 extends through slot 26 and the end 34 extends into slot 24 whereby the end 32 yieldably engages the shaft 16 to eliminate lash between the tube 14 and the shaft 16. Such refitting would require the spring clip 30 to extend around the left side of the tube 14, viewing FIG. 2, in order to eliminate the lash. This reversal feature for the spring clip 30 is made possible because both slots 24 and 26 are off-center of their corresponding surfaces and are opposite each other.

With respect to the modified embodiment of FIG. 4, the spring clip 60 cannot be reversed because the portion at 68 which abuts the outer surface of the tube 44 with slot 56 therethrough to help orientate the spring clip is lacking a similar outer surface in the reversed position. Notwithstanding, reversing the spring clip 60 of FIG. 4 also reverses the direction of the torque applied to the shaft 46. Consequently, such reversal rotates the shaft counterclockwise, whereupon the spring clip 60 eliminates lash between the shaft 46 in the counterclockwise position and the tube 44.

When the tubes 14 and 44 are rotated counterclockwise in response to rotation of the steering wheel 12, the torque applied to the tubes is transmitted to the shafts 16 and 46 via the engagement between the shafts and the polygonal bores 18. When the tubes are rotated clockwise, the torque is transmitted through the engagement between the shafts and the ends 32 and 62 of the spring clips 30 and 60, respectively. Up to a predetermined torque resistance between the shafts and tubes, the shafts and tubes rotate uniformly. When the torque resistance therebetween is above the predetermined value the tubes rotate clockwise relative to the shafts until the shaft edges engage other surfaces on the polygonal bore whereupon the shafts and tubes rotate uniformly again.

When the tubes and shafts move axially relative to each other, the spring clip ends 32 and 62 urge the shaft edges 22 into frictional engagement with polygonal bores 18. Consequently, axial forces between the shafts and tubes below the friction forces therebetween result in the uniform axial movement of the shafts and tubes. However, when the axial forces between the shafts and tubes exceed the friction focres therebetween, the shafts telescope further into the polygonal bores (or withdraw therefrom). At such time, the spring clip ends 32 and 62 frictionally slide along the shafts, or the ends 34 and 64 frictionally slide along the tubes and the walls of the slots 26 and 56, respectively, whichever offers the least resistance.

Thus, it is apparent that there has been provided, in accordance with the invention, a variable length steering column with a simple and economical spring clip 30 which eliminates any lash between a tube and a shaft in a steering column assembly. Although the preferred embodiment has been illustrated in the form of a motor vehicle steering column, it is intended that the appended claims embrace all assemblies within the spirit and scope of these claims.

I claim:
1. A variable length column assembly comprising:
a tube having an outer circumferential surface and an internal polygonal bore therein;
a shaft having a polygonal surface and extending into said tube polygonal bore, said shaft cooperating with said tube to provide for limited rotation therebetween; and
flexible means frictionally engaging said tube and said shaft to resiliently oppose the rotation therebetween and permitting axial movement between said tube and said shaft when the axial forces therebetween offset the frictional engagement therebetween, said flexible means extending over at least a portion of said tube outer circumferential surface and having one end frictionally engaged with said tube and the other end frictionally engaged with said shaft, said flexible means biasing said shaft to a rotated position relative to said tube.

2. The variable length column assembly of claim 1 in which said tube includes a pair of slots and said pair of slots are disposed on polygonal surfaces of said tube that are not opposite each other.

3. The variable length column assembly of claim 2 in which said flexible means extends through one of the slots to engage said shaft and said flexible means extends into the other slot to engage said tube at the side wall of the other slot in spaced relation to said shaft.

4. The variable length shaft of claim 1 in which said flexible means comprises a spring clip, said spring clip including substantially U-shaped bends at each end of said U-shaped bends engaging said tube and said shaft, respectively.

5. The variable length column assembly comprising:
a tube having a polygonal bore therein and a pair of openings therethrough;
a shaft having a polygonal surface telescoping into the polygonal bore, said shaft and tube cooperating with each other to provide for torsional lash therebetween; and
releasable coupling means deflecting to extend over said tube and into said openings, said releasable coupling means having one end engaging said tube and another end engaging said shaft to resiliently oppose the torsional lash therebetween.

6. The variable length column of claim 5 in which the openings on said tube comprise a pair of axially elongated slots and said shaft extends into the polygonal bore past said axially elongated slots.

* * * * *